United States Patent [19]

Faerber et al.

[11] Patent Number: 5,150,631
[45] Date of Patent: Sep. 29, 1992

[54] FLEXIBLE THERMOPLASTIC RACK BAR

[75] Inventors: Manfred Faerber, Wielenbach; Otto Wienchol, Pullach; Bernd Schleicher, Munich, all of Fed. Rep. of Germany

[73] Assignee: Webasto AG Fahrzeugtechnik, Stockdorf, Fed. Rep. of Germany

[21] Appl. No.: 759,666

[22] Filed: Sep. 13, 1991

[30] Foreign Application Priority Data

Sep. 13, 1990 [DE] Fed. Rep. of Germany ....... 4029011

[51] Int. Cl.[5] .......................... F16H 29/20; F16C 1/20
[52] U.S. Cl. .................................... 74/422; 74/502.5; 74/89.17; 74/501.6
[58] Field of Search ................. 74/89.17, 89.18, 89.11, 74/109, 120, 422, 501.6, 502.5

[56] References Cited

U.S. PATENT DOCUMENTS

| 2,986,954 | 6/1961 | Werner | 74/502.5 |
| 3,394,410 | 7/1968 | Liebowitz | 74/502.5 X |
| 3,834,247 | 9/1974 | Belsdorf et al. | 74/422 |
| 3,854,418 | 12/1974 | Bertin | 74/422 X |
| 4,598,451 | 7/1986 | Ohki | 74/422 X |
| 4,690,177 | 9/1987 | Gehring et al. | 74/422 X |
| 4,919,005 | 4/1990 | Schleicher | 74/501.6 |
| 4,969,681 | 11/1990 | Schleicher et al. | 296/223 |
| 4,978,165 | 12/1990 | Schreiter et al. | 296/216 |
| 5,056,578 | 10/1991 | Helver | 74/422 X |
| 5,069,080 | 12/1991 | Simon | 74/422 |

FOREIGN PATENT DOCUMENTS

| 2033042 | 1/1972 | Fed. Rep. of Germany | 74/422 |
| 3123554 | 3/1985 | Fed. Rep. of Germany | . |
| 8531110 | 4/1987 | Fed. Rep. of Germany | . |
| 1415032 | 11/1975 | United Kingdom | . |

Primary Examiner—Allan D. Herrmann
Assistant Examiner—Julie Krolikowski
Attorney, Agent, or Firm—Sixbey, Friedman, Leedom & Ferguson

[57] ABSTRACT

Flexible thermoplastic rack bar for meshing with a gear wheel, particularly for the drive of displaceable vehicle elements, like roof elements, sliding windows, and the like, having a series of supported teeth and a pull-resistant reinforcement embedded essentially parallel to a pitch line of the rack bar. The rack bar teeth are supported on at each lateral side and the reinforcement is disposed only in a cross-sectional area of the rack bar which lies heightwise between the head and the root of the rack bar teeth, preferably, substantially along a central transverse plane of the rack bar.

20 Claims, 3 Drawing Sheets

FLEXIBLE THERMOPLASTIC RACK BAR

BACKGROUND OF THE INVENTION

The invention relates to a flexible thermoplastic rack bar for meshing with a gear wheel, particularly intended for the drive of displaceable motor vehicle elements, like roof parts, sliding windows, and the like, having a series of supported teeth and a pull-resistant reinforcement embedded substantially parallel to a separation line of the rack bar.

It is a known rack bar of this kind (German Patent 31 23 554), the rack bar teeth are supported in their root area on one side. As a reinforcement, a steel band is located below the teeth, which has lateral clips which extend into the individual teeth of the rack bar. The manufacture of such a reinforcement is relatively costly, and furthermore, the obtainable tooth height for a preselected height dimension of the rack bar is limited, which has a detrimental effect on the transfer of force, in spite of the clips reaching into the individual teeth.

Similar problems regarding the ratio of cross-sectional surface and transferable force are encountered in connection with another known rack bar (German Gebranchsmuster 85 31 110), in which a series of individual, short rack bar segments made of synthetic material have two wire ropes embedded in the root area of the rack bar teeth, the wire ropes extending parallel to the longitudinal direction of the rack bar, interconnecting the individual segments.

SUMMARY OF THE INVENTION

It is the primary object of the present invention to provide a flexible thermoplastic rack bar, which is easy to manufacture, and has preselected cross-sectional dimensions which will facilitate an increased transfer of force.

Based on a flexible thermoplastic rack bar of the kind described above, the above-noted object of the invention is achieved by unilaterally supporting the rack bar teeth at both flanks, and by arranging the reinforcement only in a cross-sectional area of the rack bar which is between the head and the root of the rack bar teeth.

In the rack bar according to the invention, the pull-resistant reinforcement is disposed directly at, or in closest proximity to the force transfer point of the gearing. This, and the bilateral support of the teeth, ensure that a particularly high degree of tooth stability is obtained by simple means. Moreover, the inventive design facilitates the maintaining of an especially large ratio of tooth height to the outer dimension of the rack bar in the direction of the tooth height. Accordingly, the transferable force, relative to the rack bar cross section, is substantially increased over that of the prior art.

Thus, the reinforcement, appropriately, extends substantially along the center plane of the rack bar. The reinforcement may simply consist of at least one grid band in whose longitudinal direction there is a series of through openings with a division corresponding to the division of the rack bar teeth, whereby the through openings, with respect to the rack bar teeth, are aligned and dimensioned such that the grid band leaves openings between the rack bar teeth. In this manner, grid band webs separating the through openings from each other are embedded into the teeth, a fact, which, in connection with the bilateral support of the teeth, results in a particularly high degree of tooth stability.

Appropriately, the through openings of the grid band are at least approximately centered with respect to the rack bar teeth. The through openings of the grid band may be enclosed on all sides, when viewed from the top. In accordance with another embodiment, the design also can be such that the through openings of the grid band in top view are alternatingly open at one or the other longitudinal side of the grid band. With all other conditions being equal, the first variation results in a higher degree of pull resistance of the rack bar, while the second variation facilitates an increased lateral flexibility of the rack bar. In either case, the grid band advantageously can be made of spring steel or similar material. However, the reinforcement may also consist of at least one fiber strand, made of steel rope, glass fibers, carbon fibers, aramid fibers, or the like, at each side of the rack bar teeth.

To ensure a particularly favorable meshing of the gearing with the rack bar, the rack bar teeth, preferably, but not necessarily have a conventional involute gear profile. The tooth height of the rack bar teeth is, advantageously, in a range of 0.5 to 1.0 and preferably in a range of 0.6 to 0.8 times the outer dimension of the rack bar in the direction of the tooth height.

In instances where a particularly high degree of tooth stability is essential, the rack bar teeth can be additionally supported in the root area. Conversely, if the rack is provided with a series of through openings in the root area of the rack bar teeth, an increased flexibility of the rack bar is ensured.

Consecutive rack bar teeth can be connected at both sides via a web whose height is in a range of 0.6 to 1.0 times the tooth height.

The outer surface of the rack bar, further, can be formed such that it abuts only part of the outer surface of the guide element which at least partially surrounds it. Such a construction reduces sliding friction between the rack bar and the guide element.

These and further objects, features and advantages of the present invention will become apparent from the following description when taken in connection with the accompanying drawings which show, for purposes of illustration only, several embodiments in accordance with the present invention.

DETAILED DESCRIPTION OF THE PREFERRED EMBODIMENTS

Figure 1:
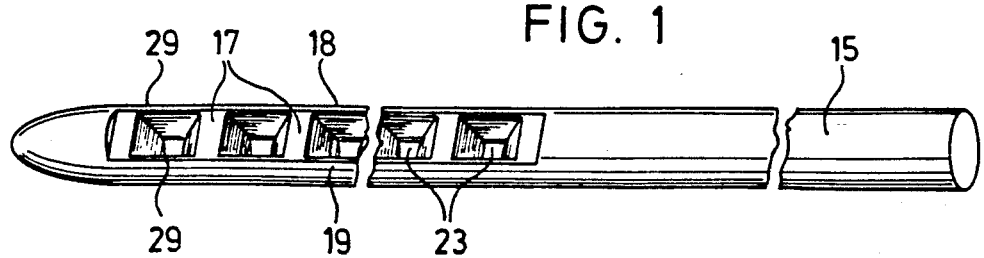
FIG. 1 is a perspective view of a portion of a rack bar, made of synthetic material, in accordance with the invention.
Figure 2:
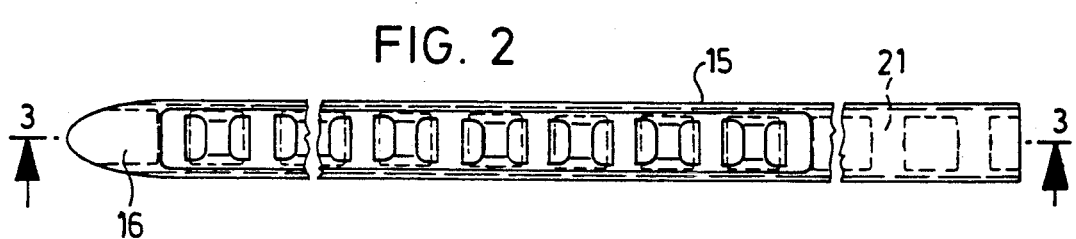
FIG. 2 is a partial top view onto the rack bar shown in FIG. 1.
Figure 3:
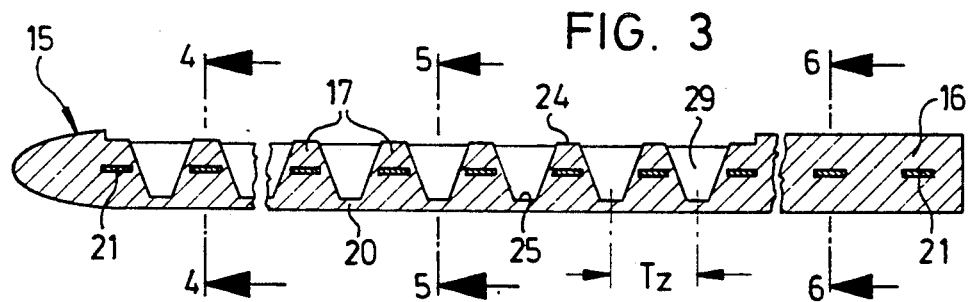
FIG. 3 is a longitudinal section taken along line 3—3 of FIG. 2.

The rack bar, designated 15 as a whole, and depicted in FIGS. 1-7, has a flexible cable-like body 16, made of synthetic material, which, for example, can be made of thermoplastic polyester, elastomer or polyamide material. The tooth rack 15 is provided with a series of teeth 17 along its length. The pitch of the teeth is designated $T_z$ in FIG. 3, and the teeth have preferably, but not necessarily a conventional involute profile, even though not depicted as such. In the example depicted, adjacent teeth 17 are connected at both sides 18 and 19, as well as in their root area 20.

A grid band 21 is embedded into thermoplastic body 16 as a pull-resistance reinforcement. The grid band 21 consists of spring steel or another material capable of imparting the necessary pull resistance to the thermoplastic body. As can be seen particularly from FIG. 7, a series of openings 22 are formed in the longitudinal direction of the grid band 21. The interval of these recesses is designated with $T_a$ in FIG. 7, whereby $T_a$ equals pitch $T_z$ of teeth 17. The openings 22 are aligned and dimensioned with respect to teeth 17 in such manner that grid band 21 leaves the openings 23 between the teeth 17 unobstructed. The grid band 21 extends parallel to the pitch line of rack bar 15 in a cross-sectional area of the rack bar disposed, in the direction of the tooth height, between head 24 and root 25 of teeth 17, so that one of the cross webs 26 of grid band 21 transversely extends through each tooth 17, as specially illustrated in FIGS. 2, 3 and 4. Preferably, grid band 21 extends along the center plane of rack bar 15, whereby its center axis 27 is somewhat below the profile center axis 28 of teeth 17 (FIG. 5), at or in close proximity to the force transference point of the gearing.

The rack bar 15 illustrated has a circular base cross section. Alternatively, however, other cross-sectional shapes can easily be employed, e.g. elliptical or oval base cross sections or a uniform or non-uniform polygonal base cross section. Independent of the base cross section chosen in a specific case, a tooth height a can be selected which, with respect to the outer dimension of the rack bar 15 in the direction of the tooth height, i.e. the overall height b of the rack bar (FIG. 5), is relatively large. Accordingly, in the FIG. 5 example, ratio a/b has a value of about 0.72. Generally, for the ratio a/b, a range of 0.5 to 1.0, and, preferably, of 0.6 to 0.8 is appropriate.

In the rack bar 15 depicted, adjacent teeth 17 are interconnected by a respective web 29 of thermoplastic body 16 at each of sides 18, 19, and the longitudinal webs 30 of grid band 21 embedded therein. In the example depicted, the height of webs 29 is essentially equal to the tooth height a. If, however, an increased flexibility of the rack bar is of importance, the height of webs 29 can be selected to be smaller than the tooth height a, and preferably within a range of 0.6 to 1.0 times of the tooth height.

Figure 8:
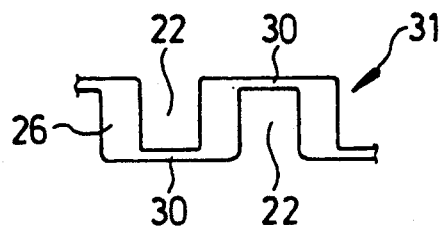
FIG. 8 is a partial top view onto a modified grid band embodiment.

While in the embodiment of the grid band 21 in accordance with FIGS. 2 to 7, the grid band openings 22, respectively, are enclosed on all sides by the cross webs 26 and the longitudinal webs 30 of the grid band, FIG. 8 shows a modified grid band 31, which, in top view, has a meander shape, so that the openings 22 of the grid band in top view alternatingly are laterally closed at only one or the other longitudinal side of the grid band 31. Such a construction enhances the lateral flexibility of the rack bar, which can be a significant benefit when the rack bar is used as a drive cable.

Figure 9:
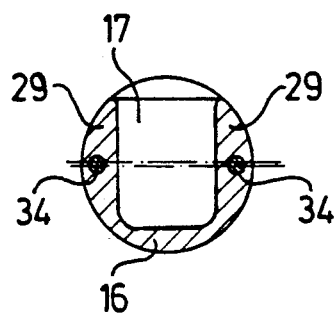
FIG. 9 a cross-sectional view of a synthetic material rack bar, corresponding to that of FIG. 5, showing a different form of reinforcement.

A further modified embodiment of the rack bar in accordance with FIG. 9, differs from the previously described embodiments in that, in place of the grid band 21, 31, a continuous fiber strand 34 is used as a reinforcement at each side of the rack teeth 17, respectively. Each such fiber strand 34 extends in the longitudinal direction of the rack bar, and may consist, in particular, of a steel rope, glass fibers, carbon fibers, aramid fibers, or similar pull-resistant fibers.

Figure 10:
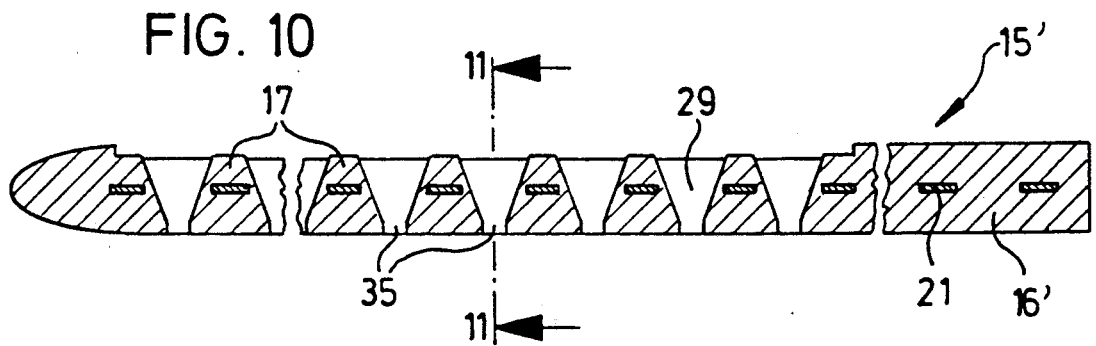
FIG. 10 is a longitudinal sectional view, corresponding to that of FIG. 3, showing a variation of a synthetic material rack bar in which a series of through openings are formed in the root area of the rack bar teeth.
Figure 11:
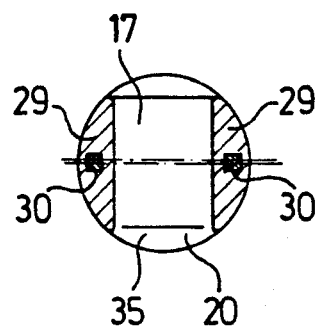
FIG. 11 is a cross-sectional view taken along line 11—11 of FIG. 10.

FIGS. 10 and 11 show a modified rack bar 15' which differs from the rack bar 15 according to FIGS. 1-7 only in that its thermoplastic body 16' is provided with a series of through openings 35 in the root area 20 of teeth 17. If required, this design, likewise, facilitates increased flexibility of the rack bar.

Figure 4:
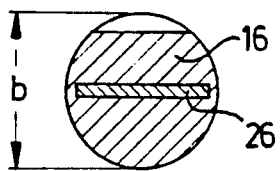
FIG. 4 is a cross-sectional view taken along line 4—4 of FIG. 3.
Figure 5:
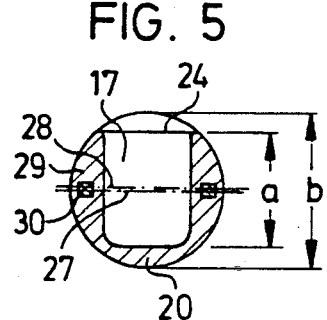
FIG. 5 is a cross-sectional view taken along line 5—5 of FIG. 3.
Figure 6:
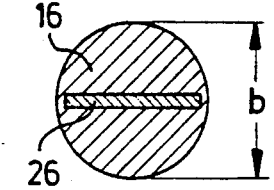
FIG. 6 is a cross-sectional view taken along line 6—6 of FIG. 3.
Figure 7:
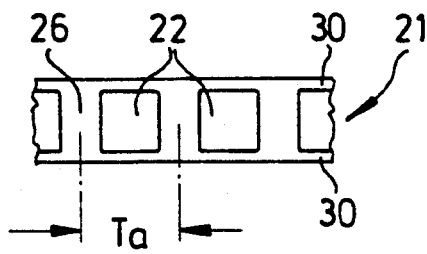
FIG. 7 is a partial top view onto the grid band, used as reinforcement for the synthetic material rack bar of FIGS. 1-6.
Figure 12:
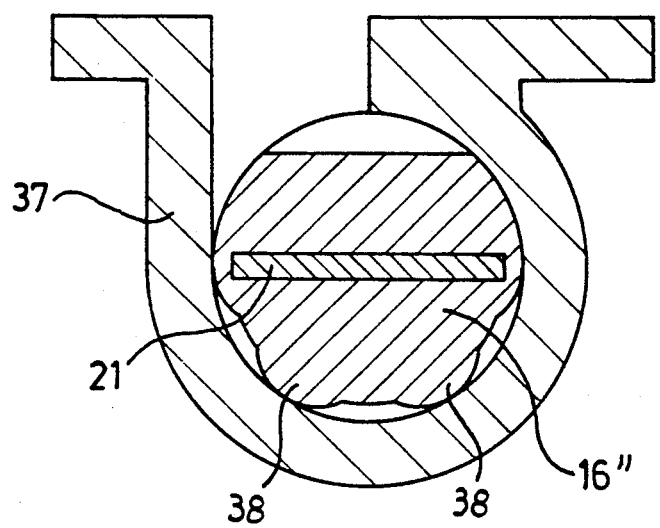
FIGS. 12 and 13 are cross-sectional views, corresponding to those of FIGS. 4 and 5, for a rack bar with a different outer contour.
Figure 13:
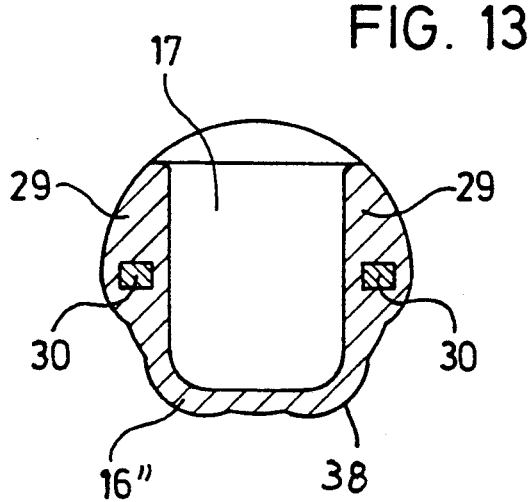

FIGS. 12 and 13, finally, depict cross-sections in accordance with FIGS. 4 and 5, in which the thermoplastic body 16'' of the rack bar, in the area of its outer surface, is formed such that the rack bar only abuts with part of the facing surface of a guide element 37, which at least partially surrounds its circumference, for example at the inside wall of a guide tube or a cylindrical guide channel. For example, as shown in FIG. 13, the outer surface of the rack bar has a cross-sectional shape forming lobes 38, the apex of which slide on the inner surface of the guide tube. In this manner, the sliding friction of the rack bar can be minimized in the associated guide element.

The flexible rack bars described are especially suitable for the drive of displaceable motor vehicle elements, like automatic windows or roof parts, e.g. the covers of sliding roofs, lifting roofs, sliding lifting roofs, and the like. In each case, the rack bar, appropriately, is made as a molded or continuous casting part, whereby, guide elements and the like, e.g. slide members, can be molded to the rack bar, as required. For example, the cable-like nature of the rack bar enables it to be utilizable for the drive cables of motor vehicle roofs of the type shown in U.S. Pat. Nos. 4,978,165; 4,919,005; 4,969,681, etc.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A flexible thermoplastic toothed rack bar for meshing with a gear wheel, comprising an elongated body of a plastic material, said body being formed with a series of teeth that are supported by a pull-resistant reinforcement that is embedded in the body substantially parallel to a pitch line of the rack bar; wherein the teeth are connected at each lateral side of the rack bar;

and wherein the reinforcement is confined to a cross-sectional area of the rack bar which lies heightwise between a head and a root of said teeth.

2. Thermoplastic rack bar according to claim 1, wherein the reinforcement extends substantially along a central transverse plane of the rack bar.

3. Thermoplastic rack bar according to claim 2, wherein the reinforcement is a grid band having a longitudinally extending series of openings at an interval corresponding to the pitch of the teeth of the rack bar; and wherein the openings are oriented and dimensioned relative to the teeth of the rack bar such that the grid band leaves unobstructed openings between said teeth.

4. Thermoplastic rack bar according to claim 3, wherein the openings of the grid band are at least approximately centered relative to the teeth of the rack bar.

5. Thermoplastic rack bar according to claim 3, wherein the openings of the grid band are enclosed on all sides, when seen in a top view.

6. Thermoplastic rack bar according to claim 3, wherein the openings of the grid band are laterally closed at only one side thereof in a manner alternating between opposite sides of the grid band so as to give the grid band a meander shape when viewed from the top.

7. Thermoplastic rack bar according to claim 3, wherein the grid band is made of a spring steel type material.

8. Thermoplastic rack bar according to claim 1, wherein the reinforcement comprises at least one fiber strand at each side of the teeth of the rack bar.

9. Thermoplastic rack bar according to claim 8, wherein the fiber strand is selected from the group consisting of steel rope, glass fibers, carbon fibers, and aramid fibers.

10. Thermoplastic rack bar according to claim 1, wherein the teeth have a height a relative to a height of the rack bar b such that a/b equals 0.5 to 1.0.

11. Thermoplastic rack bar according to claim 1, wherein the teeth have a height a relative to a height of the rack bar b such that a/b equals 0.6 to 0.8.

12. Thermoplastic rack bar according to claim 1, wherein the teeth of the rack bar are also connected in a root area thereof.

13. Thermoplastic rack bar according to claim 1, wherein the rack bar is provided with a through opening between adjacent teeth of the rack bar in a root area thereof.

14. Thermoplastic rack bar according to claim 1, wherein the teeth of the rack bar are interconnected via a web at each lateral side thereof.

15. Thermoplastic rack bar according to claim 14, wherein the web has a height within 0.6 to 1.0 of the height of the teeth of the rack bar.

16. Thermoplastic rack bar according to claim 1, wherein the rack bar is slidably disposed within a guide element; and wherein an outer surface of the rack bar is formed such that it engages only at part of a facing inner surface of the guide element which at least partially surrounds its circumference.

17. Thermoplastic rack bar according to claim 16, wherein said guide element comprises a guide tube having a cylindrical guide channel; and wherein the outer surface of the rack bar has a cross-sectional shape forming lobes, each lobe having an apex which slide on the inner surface of the guide tube.

18. Thermoplastic rack bar according to claim 16, wherein said rack bar has a cable-like nature and wherein said guide element is a guide tube of a drive arrangement of a cable-driven, displaceable element of a motor vehicle.

19. Thermoplastic rack bar according to claim 18, wherein said displaceable element is a closure for a vehicle body opening.

20. Thermoplastic rack bar according to claim 1, wherein the reinforcement is a grid band having a longitudinally extending series of openings at an interval corresponding to the pitch of the teeth of the rack bar; and wherein the openings are oriented and dimensioned relative to the teeth of the rack bar such that the grid band leaves unobstructed openings between said teeth.

* * * * *